(12) United States Patent
Hightower

(10) Patent No.: US 7,178,886 B2
(45) Date of Patent: Feb. 20, 2007

(54) CABINETS WITH FALSE FRONTS AND ASSOCIATED FALSE FRONT CONNECTORS

(75) Inventor: Robert C. Hightower, High Point, NC (US)

(73) Assignee: Tenn-Tex Plastics, Inc., Colfax, NC (US)

( * ) Notice: Subject to any disclaimer, the term of this patent is extended or adjusted under 35 U.S.C. 154(b) by 403 days.

(21) Appl. No.: 10/667,181

(22) Filed: Sep. 19, 2003

(65) Prior Publication Data

US 2005/0062377 A1 Mar. 24, 2005

(51) Int. Cl.
*A47B 17/04* (2006.01)

(52) U.S. Cl. .................... 312/265.5; 312/204

(58) Field of Classification Search .......... 312/265.5, 312/265.6, 257.1, 263, 204; 24/555, 545, 24/531, 336; 403/329
See application file for complete search history.

(56) References Cited

U.S. PATENT DOCUMENTS

| | | | | |
|---|---|---|---|---|
| 1,973,971 A * | 9/1934 | West | .................. | 292/76 |
| 2,526,539 A * | 10/1950 | Carroll | ................ | 292/17 |
| 2,629,435 A * | 2/1953 | Dadswell | .............. | 160/190 |
| 3,279,011 A | 10/1966 | Flora | .................. | 24/73 |
| 3,410,327 A * | 11/1968 | Ausnit | ................ | 383/65 |
| 3,707,061 A * | 12/1972 | Collette et al. | ........... | 52/288.1 |
| 3,979,796 A * | 9/1976 | MacDonald | .............. | 49/463 |
| 4,153,314 A | 5/1979 | Prater | ................ | 312/320 |
| 4,598,508 A * | 7/1986 | Baum | ................ | 52/106 |
| 4,685,751 A * | 8/1987 | Dupree | ................ | 312/263 |
| 5,176,435 A * | 1/1993 | Pipkens | .............. | 312/204 |
| 5,542,757 A | 8/1996 | Chang | ................ | 312/223.2 |
| 5,711,554 A * | 1/1998 | Brown et al. | ............. | 292/19 |
| 6,419,330 B1 * | 7/2002 | Lechman | .............. | 312/194 |
| 6,438,913 B1 * | 8/2002 | Ishikawa et al. | ........... | 52/235 |
| 6,457,772 B1 * | 10/2002 | Forston | .............. | 297/188.14 |
| 6,557,956 B2 | 5/2003 | Hightower | ............. | 312/204 |
| 2005/0225094 A1 * | 10/2005 | Lewis et al. | ............. | 292/19 |

OTHER PUBLICATIONS

Pictures of two piece prior art connector (admitted prior art).
Pictures of one piece prior art connector (admitted prior art).

* cited by examiner

*Primary Examiner*—Janet M. Wilkens
(74) *Attorney, Agent, or Firm*—Myers Bigel Sibley & Sajovec

(57) ABSTRACT

Connectors for attaching a false front panel over an opening in an object comprise a post piece that is configured to attach to the object and a clip piece that comprises a base that is configured to attach to a rear face of the false front panel and at least one snap clip projecting from the base that is configured to receive the post. The post piece of these false front connectors includes a post that has a non-circular cross-section (e.g., a diamond shape), and the interior of the snap clip may also have a non-circular cross-section that is matched to the cross-section of the post.

40 Claims, 14 Drawing Sheets

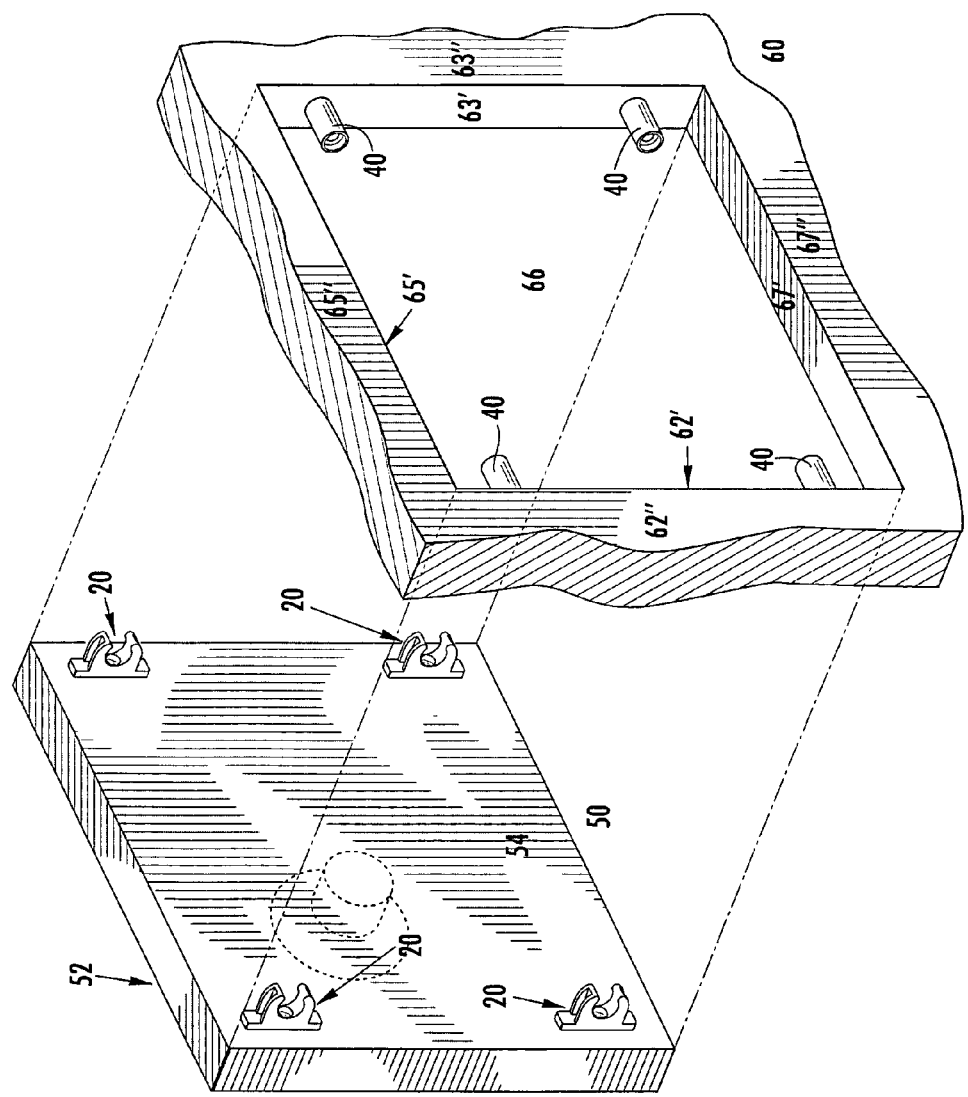

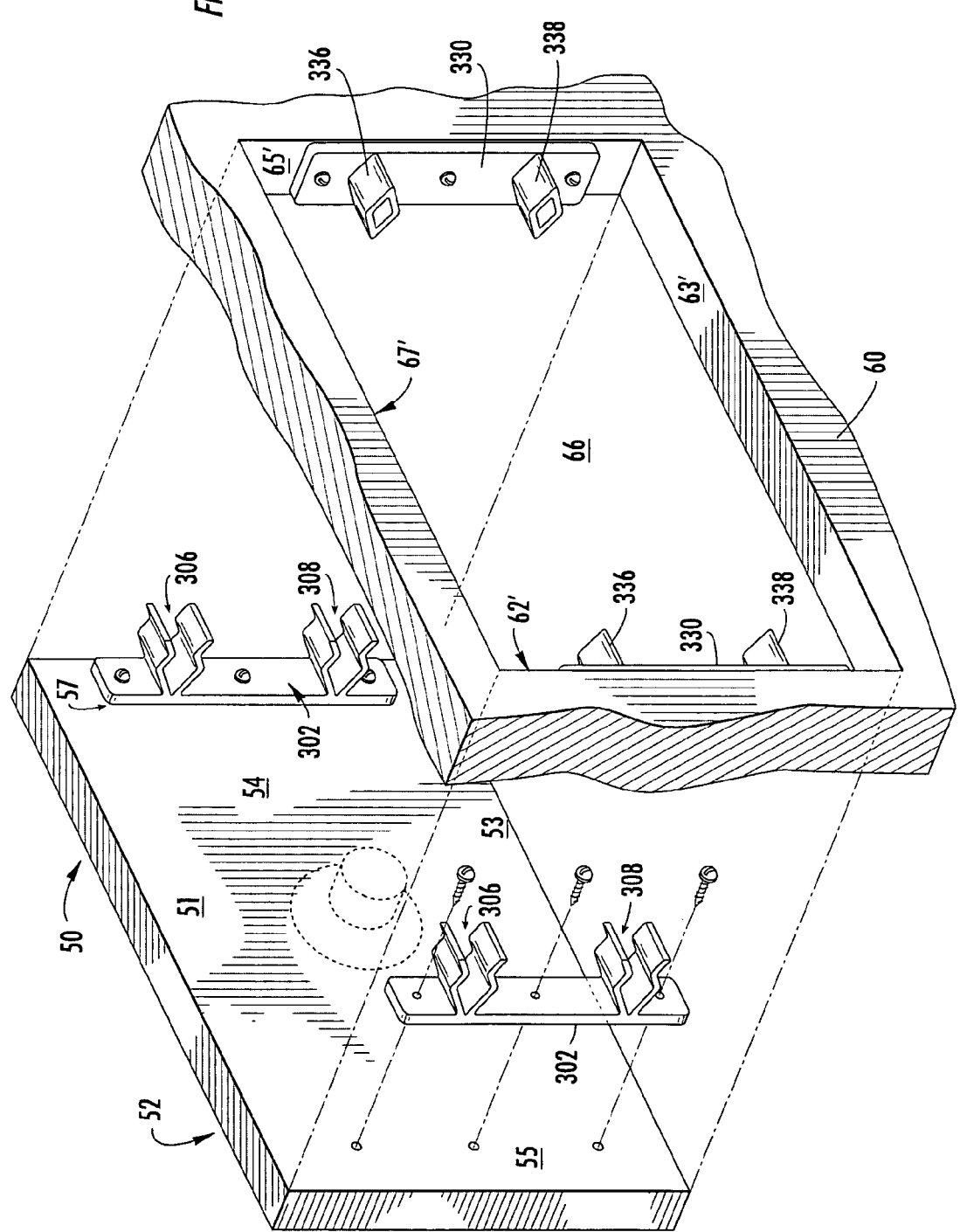

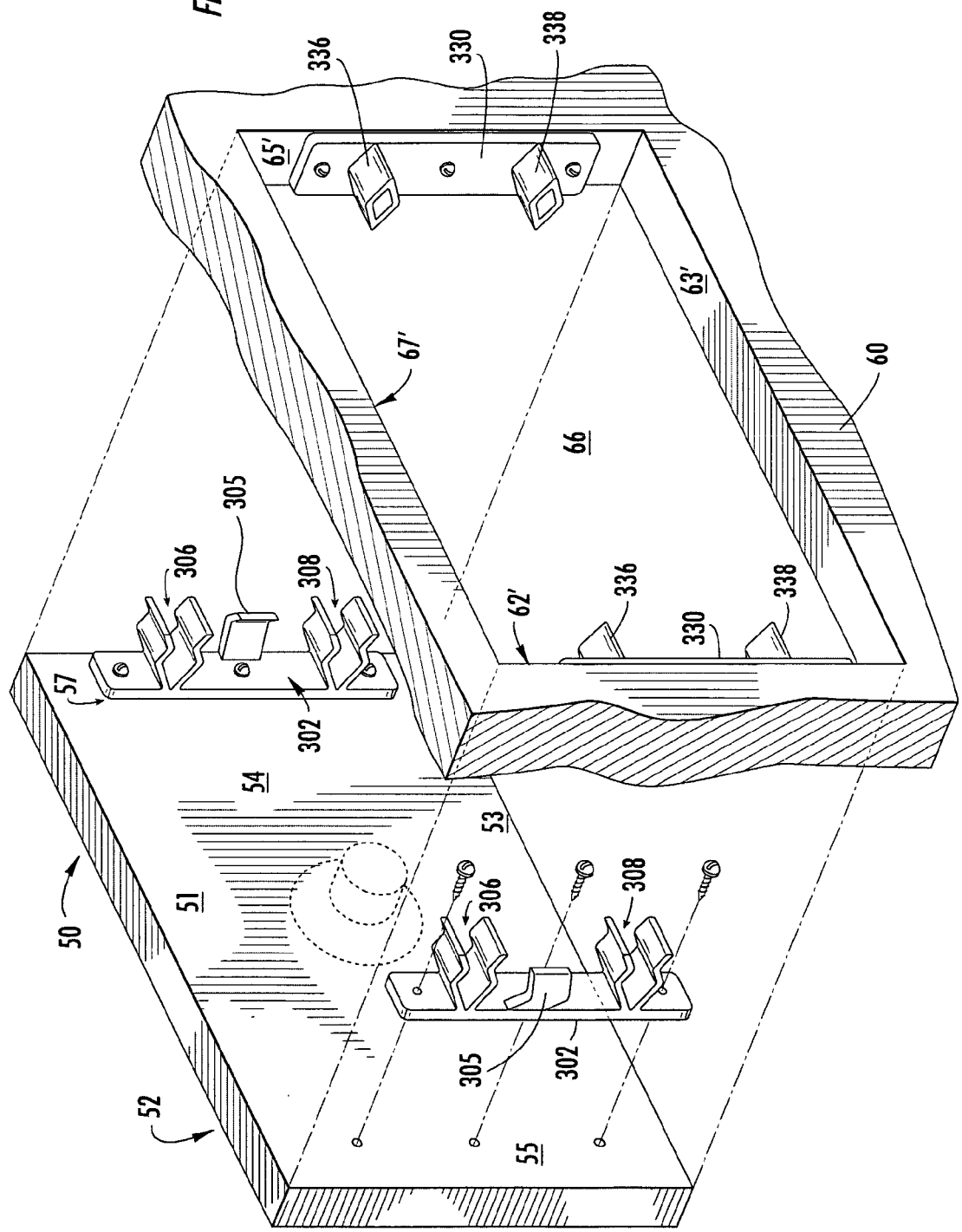

US 7,178,886 B2

CABINETS WITH FALSE FRONTS AND ASSOCIATED FALSE FRONT CONNECTORS

FIELD OF THE INVENTION

The present invention relates to cabinets or other objects having false front panels, and more particularly to false front cabinets or other objects that include false front connectors for connecting the false front panel over an opening.

BACKGROUND OF THE INVENTION

A variety of cabinets, furniture and other objects have openings which are covered by a false front panel. By way of example, cabinets in bathrooms often include a false front panel in front of the bathroom sink that appears to be the front of a drawer. Such a false front panel is usually employed to match or compliment the front panel of an adjacent drawer or drawers. The false front panel is often used to cover an opening in the face of the cabinet. Connectors are known in the art for connecting such a false front panel over the opening in the cabinet or other object.

In many applications, false front panels are designed to be releasably attached to the wall, cabinet, furniture face or other object to which they are attached. In these applications, the false front panel may be removed to provide access to items inside of the wall, cabinet or other object such as a sink. In these applications, permanent connectors such as adhesives, rivets or nails, or semi-permanent connectors such as screws, are typically inappropriate. However, various other types of false front connectors are available that may be used to releasably attach a false front panel over an opening in an object.

One known type of releasable false front connector 10 is depicted in FIG. 1A. As shown in FIG. 1A, the false front connector 10 comprises a two piece connector that includes a clip 20 and a post 40. The post 40 is cylindrical in shape, and has a top end 42 and a bottom end 44. The post 40 further includes an aperture 46 along its central axis 47 which extends from the top end 42 to the bottom end 44. As is also shown in FIG. 1A, along the central axis 47 of aperture 46 a larger countersunk recess 48 is formed in the top end 42 of post 40. The diameter of the recess 48 is sufficiently large so as to receive the head of a screw or nail. The diameter of the aperture 46, on the other hand, is smaller than the head of the screw or nail, but large enough to receive the shank end of the screw/nail. In this manner, a screw or nail may be inserted into the top end 42 of post 40 and through the bottom end 44 into an object, to connect the post 40 to the object.

The second piece of the false front connection device 10, namely the clip 20, has a thin, flat body portion 22 and a latch 30 that extends from the body portion 22. The body portion 22 further includes an aperture 24 that is configured to receive a screw (not shown in FIG. 1A). The diameter of the aperture 24 is smaller than the head of the screw, but large enough to receive the shank end of the screw. In this manner, the screw may be inserted through the aperture 24 into a false front panel to connect the clip 20 to the false front panel. In the false front connector 10 depicted in FIG. 1A, the aperture 24 is located in the center of the body portion 22, between the two arms 32, 34 of the latch 30.

The latch 30 comprises a pair of opposed arms 32, 34 and a base portion 36. The arms 32, 34 are configured to receive the post 40. The arms 32, 34 connect to the top part of base 36, and together the inside portion of arms 32, 34 and the top portion of base 36 form a partial cylinder having a diameter slightly larger than the diameter of the post 40. The distal ends of arms 32, 34 are separated by a gap 38. This gap 38 is smaller than the diameter of the post 40. Both the clip 20 and the post 40 are typically formed out of a polymeric material such as HIPS, ABS, PC or nylon.

As shown in FIG. 1B, a plurality of clips 20 are connected to the rear side 54 of a false front panel 50. In a complimentary manner, a plurality of the posts 40 are connected to the side surfaces 62', 63' of the walls 62, 63 that define part of an opening 66 in an object 60. The false front panel 50 is used to cover this opening 66 in the object 60. As shown in FIG. 1B, typically four separate false front connectors 10 are used to connect the false front panel 50 over the opening 66 in the object 60. As shown in FIG. 1B, the false front connectors may be arranged so that the posts 40 are attached at the top and bottom of the side surfaces 62', 63' of the walls 62, 63 that define the side of the opening 66 with the clips 20 similarly arranged adjacent the top and bottom of each side of the back surface 54 of the false front panel 50. The false front connectors 10 may alternatively be arranged so that a clip 20 is provided at the center of the top, bottom and side edges of the rear side 54 of false front panel 50, and so that the posts 40 are inserted at the corresponding locations at the center of side surfaces 65', 67', 62', 63' of the walls 65, 67, 62, 63 that define the opening 66. Other arrangements and/or numbers of the connectors 10 could also be used to attach the false front panel 50 over the opening 66.

As shown in FIG. 1B, when the false front panel 50 is placed over the opening 66 in the object 60, the clips 20 are aligned with the corresponding posts 40 which extend out into the opening 66. A force may then be applied to the front side 52 of the false front panel 50, which acts to enlarge the gap 38 between the arms 32, 34 on each clip 20 by forcing the arms 32, 34 to deflect away from each other. When the arms 32, 34 are sufficiently deflected, the posts 40 pass through the gap 38 in the corresponding clip 20. The arms 32, 34 then snap back into their original positions, thereby locking the posts 40 into their respective latches 30 on the clips 20. In this manner the false front panel 50 is attached over the opening 66. The false front panel 50 may later be removed by pulling on the front side 52 of the false front panel 50 with sufficient force to separate the posts 40 from their respective latches 30.

FIG. 2A depicts another known false front connector 70. The false front connector 70 likewise is a two piece connector that includes a clip 80 and a post 100. The post 100 is cylindrical in shape, and includes an aperture 102 along its central axis 104 having a diameter that is smaller than the head of the screw or nail, but large enough to receive the shank end of the screw/nail. In this manner, a screw or nail may be inserted through the aperture 102 into an object to connect the post 100 to the object.

The clip 80 has a base 82 and a pair of arms 92, 94 that extend substantially perpendicular from the base 82. The base 82 includes an aperture 84 that is configured to receive a screw (the screw is not shown in FIG. 2A). The diameter of the aperture 84 is smaller than the head of the screw, but large enough to receive the shank end of the screw so that the screw may be inserted through the aperture 84 into a false front panel to connect the clip 80 to the false front panel. The arms 92, 94 extend from respective sides of the base 82, and are configured to receive the post 100. The inner sides of arms 92, 94 are curved so that they together form opposing sides of an incomplete cylinder that has a diameter slightly larger than the diameter of the post 100. The distal ends of arms 92, 94 are separated by a gap 98. This gap 98 is smaller than the diameter of the post 100. The clip 80 is formed of a flexible metal such as aluminum and the post 100 is formed out of thermoplastic, HIPS, ABS, nylon, PC, HPPE or PP. As shown in FIG. 2B, false front connector 70 may be used in a fashion identical to false front connector 10 to connect a false front panel 50 over an opening 66 in an object 60.

Yet another known type of false front connector device 110 is depicted in FIG. 3A. As shown in FIG. 3A, the false front connector 110 is a one piece connector that has a base portion 120 and three fingers 130, 140, 150 which extend at a right angle from one edge of the base portion 120. The base portion 120 is thin and flat, and the front side 122 of the base portion 120 (the side opposite the rear side 124 from which the fingers 130, 140, 150 extend) may be glued or stapled to the rear side of a false front panel.

The fingers 130, 140, 150 of the false front connector 110 have respective flat strips 132, 142, 152 which extend at a 90 degree angle from one edge of the rear side 124 of the base portion 120. Each flat strip 132, 142, 152 includes at its distal end an abutment 134, 144, 154 that extends from the side of the strip 132, 142, 152 opposite the base portion 120. Each of the abutments 134, 144, 154 has a cross section in the shape of a right triangle, and is somewhat thicker than either the flat strips 132, 142, 152 or the base portion 120. Each of the abutments 134, 144, 154 extends from the flat strips 132, 142, 152 such that one short side of its right triangle cross section attaches to its respective flat strip 132, 142, 152, and the other short side of the right triangle extends at a right angle from the respective flat strip 132, 142, 152 in a plane that is parallel to the plane of the base portion 120. The abutments 134, 144, 154 are sized differently such that they extend different distances up the flat strips 132, 142, 152 towards the base portion 120. The connector 110 is formed out of ABS, PC or nylon.

As shown in FIGS. 3A and 3B, the front side 122 of the base portion 120 is connected to the rear side 54 of a false front panel 50. A connector 110 may be provided at the center edge of the top, bottom and sides of the rear side 54 of the false front panel 50 as illustrated in FIG. 3B, and are located such that the fingers 130, 140, 150 of each connector 110 will fit just within the respective top, bottom and sides of the opening 66. When the false front panel 50 is placed over the opening 66 in the object 60, the long side of each of the abutments 134, 144, 154, which are angled with respect to the walls 62, 63, 65, 67 that define the opening 66, engage the edges of the respective walls 62, 63, 65, 67. When a force is applied to the front surfaces 52 of the false front panel 50, this results in a force being applied by the walls 62, 63, 65, 67 on the abutments 134, 144, 154 of the particular connector 110 adjacent each respective wall. The force on the abutments 134, 144, 154 causes the fingers 130, 140, 150 to deflect in a direction away from the respective wall 62, 63, 65, 67, such that the abutments 134, 144, 154 on each connector 110 pass through the side surfaces 62', 63', 65', 67' of the walls 62, 63, 65, 67 that define the opening 66. Once the abutments 134, 144, 154 on each connector 110 have cleared the side surfaces 62', 63', 65', 67' of the walls 62, 63, 65, 67, the force on the abutments 134, 144, 154 is released, and the fingers 130, 140, 150 on each connector spring back into their normal position. When this occurs, the abutments 134, 144, 154 on each connector 110 are positioned behind and engage the rear surface 62", 63", 65", 67" of the respective walls 62, 63, 65, 67, locking the false front panel 50 into place over the opening 66.

A fourth type of known false front connector 200 is depicted in FIG. 4A. As illustrated in FIG. 4A, the connector 200 comprises a body portion 210 and a plurality of clips 230, 240, 250 which extend from the body portion 210. The clips 230, 240, 250 are spring clips that are designed to deflect when the distal portion of the clip engages an object. The body portion 210 includes a plurality of apertures 224 that are configured to receive a fastener such as a screw or a nail. FIG. 4B illustrates how a pair of the false front connectors 200 may be used to attach a false front panel 50 over an opening 66 in an object 60.

Preferably, a false front connector will be inexpensive, easy to use, and provide a secure connection. Many prior art connectors, however, are not particularly easy to use and/or do not provide a secure connection. Accordingly, there is a need for improved false front connectors.

SUMMARY OF THE INVENTION

Connectors are provided that may be used to attach a false front panel over an opening in an object. Cabinets employing these connectors are also provided. The false front connectors according to embodiments of the present invention may be used with false front panels that are to be either permanently joined or releasably attached over the opening in the object. In certain embodiments of the present invention, the false front connectors comprise a post piece that is configured to attach to the object and a clip piece that comprises a base that is configured to attach to a rear face of the false front panel and at least one snap clip projecting from the base that is configured to receive the post. The post piece of these false front connectors includes a post that has a non-circular cross-section, and the interior of the snap clip may also have a non-circular cross-section that is matched to the cross-section of the post.

In embodiments of the present invention, the non-circular cross-section of the post may define a polygon. The polygon may have a major axis and a minor axis that is shorter than the major axis. In specific embodiments, the post may have a cross-section that defines a diamond, a hexagon or a kite-shape. The post piece may further include a base panel that has a rear face configured to attach to the object. In such embodiments, the post may extend outwardly from the front face of the base panel. All or part of an exterior edge of the base panel may also include a raised lip that may facilitate aligning the post piece and/or that may serve to space the false front panel from the object when the false front panel is connected to the object using the connectors of the present invention. The post piece and the clip piece may each comprise a unitary piece that is made of a polymeric material.

In other embodiments of the present invention, the clip piece of the false front connector may include a base that is configured to attach to a rear face of the false front panel and a snap clip that has a pair of opposed arms that project from the base. The opposed arms of the snap clip each have a first segment that is generally adjacent to the base and a second segment that projects outwardly from a distal portion of the first segment. Additionally, the base and the inner face of the first segment of each of the arms may define an obtuse angle. Moreover, each arm of the snap clip may also include third segments that project from the distal end of the second segment of each respective arm of the snap clip. The clip piece may also include a second snap clip. The post piece on these false front connectors may include a post that is configured to be received within an opening provided between the pair of opposed arms of the snap clip. The post piece may include a base panel that has a rear face that is configured to attach to the object, and this base panel may further include a raised lip. The post piece may also include a second post that is configured to be received within the opening in the second snap clip.

BRIEF DESCRIPTION OF THE DRAWINGS

FIG. 1B is an exploded view of four of the false front connectors of FIG. 1A being used to connect a false front panel over an opening in an object.

FIG. 9 is a perspective view of a pair of the two piece false front connectors depicted in FIGS. 5–8 being used to connect a false front panel over an opening in an object.

FIG. 12 is a perspective view of a pair of two piece false front connectors according to an alternative embodiment of the present invention being used to connect a false front panel over an opening in an object.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. The dimensions of some components may be exaggerated for clarity.

The discussion herein relates to false front connectors that may be used to attach a false front panel over an opening in an object such as a cabinet. FIGS. 5–10 illustrate one embodiment of a two-piece false front connector 300 according to the present invention.

Figure 6:
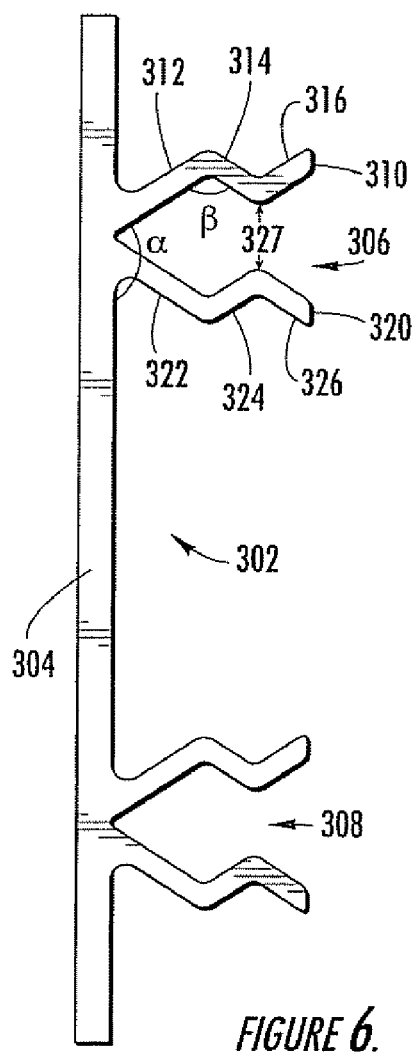
FIG. 6 is a side elevational view of the clip piece of FIG. 5.
Figure 5:
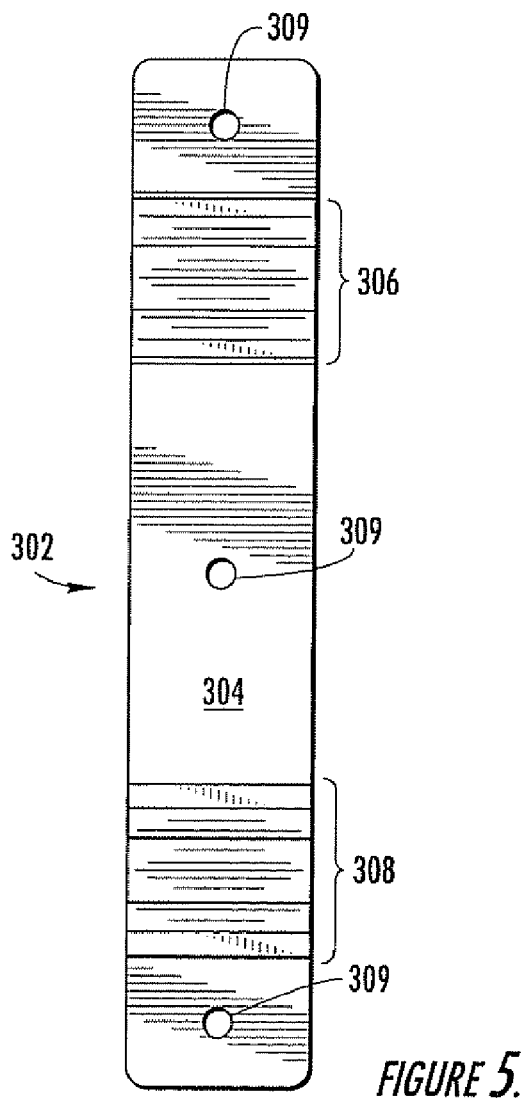
FIG. 5 is a front plan view of a clip piece of a false front connector according to embodiments of the present invention.

FIGS. 5 and 6 depict the clip piece 302 of the false front connector 300. As seen best in FIG. 6, the clip piece 302 includes a base 304 and a pair of snap clips 306, 308. As used herein, the term "snap clip" refers to a spring clip that has one or more arms that are designed to deflect when the snap clip is pushed against a post with which the snap clip mates and which spring back towards their original positions after the post is received sufficiently within the interior portion of the snap clip. In the embodiment of FIGS. 5–10, the base 304 may comprise a thin, elongate strip that supports the two snap clips 306, 308. However, it will be appreciated that the base 304 may have a wide variety of configurations, and thus it need not be thin or elongate, and it may support one, two, or more snap clips. As shown in FIG. 6, the base 304 may include one or more apertures 309 that may be configured to receive a nail, screw, staple or other fastener that may be used to attach the clip piece 302 to the rear side 54 of the false front panel 50.

The snap clip 306 projects outwardly from the base 304. The snap clip 306 includes a pair of opposed arms 310, 320 that are configured to receive a post. The arm 310 has a first segment 312 that connects to the base 304, a second segment 314 that projects outwardly from the distal end of the first segment 312, and a third segment 316 that projects outwardly from the distal end of the second segment 314. The arm 320 likewise has a first segment 322 that connects to the base 304, a second segment 324 that projects outwardly from the distal end of the first segment 322, and a third segment 326 that projects outwardly from the distal end of the second segment 324. Each of the segments 312, 314, 316, 322, 324, 326 may be planar segments. The arm 312 may be a mirror image of the arm 320 about a plane that bisects the snap clip 306. In the embodiment of the clip piece 302 depicted in FIGS. 5–10, the third segment 316 of the arm 310 is configured to be substantially parallel to both the first segment 312 of the arm 310 and to the second segment of the arm 320. Likewise, the third segment 326 of the arm 320 is configured to be substantially parallel to the first segment 322 of the arm 320 and to the second segment of the arm 310. Together, the inside face of the first segments 312, 322 and the second segments 314, 324 of the arms 310, 320 define most, but not all, of a diamond-shaped polygon.

Additionally, the distal ends of the second segments 314, 324 of arms 310, 320 are separated by a gap 327.

In the embodiment of FIGS. 5–10, the inner faces of the first segments 312, 322 of the arms 310, 320 and the base 304 meet to define a pair of obtuse angles. This is illustrated in FIG. 6 where the obtuse angle defined by the inner face of the first segment 312 of arm 310 and the base 304 is labeled as the angle α. Additionally, the first segments 312, 322 and the second segments 314, 324 of each arm 310, 320 meet to define an angle β that is at least 90 degrees. In preferred embodiments of the present invention, β will be between approximately 110 degrees and approximately 160 degrees. For purposes of illustration, the angle defined by the first segment 312 and the second segment 314 of arm 310 is labeled angle β in FIG. 6. As best seen in FIG. 6, the snap clip 306 has a non-circular cross-section. The advantages of providing such a non-circular cross-section are discussed below.

The origin of the first segments 312, 322 of each arm 310, 320 connect to the base 304 at resilient junctions. Thus, when a force is applied to arms 310, 320, the arms may deflect about these resilient junctions. Additionally, the connections between the first segments 312, 322 and the second segments 314, 324 of each arm 310, 320 may also comprise resilient junctions that deflect when a force is applied to the arms 310, 320. The first segments 312, 322 of the arms 310, 320 may optionally be thickened adjacent to where the first segments 312, 322 of the arms 310, 320 connect to the base 304.

The snap clip 308 is substantially identical to the snap clip 306 and hence it will not be described further herein. Typically, in embodiments of the invention in which two or more snap clips are included on the clip piece 302 it will be advantageous to have the two or more snap clips have identical configurations. However, it will also be appreciated that the present invention does not require that the snap clips be identical.

Figure 7:
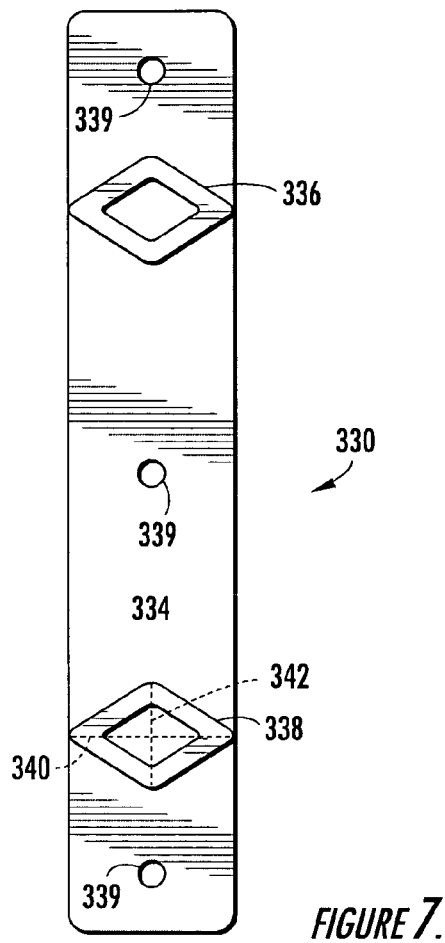
FIG. 7 is a front plan view of a post piece of a false front connector according to embodiments of the present invention.
Figure 8A:
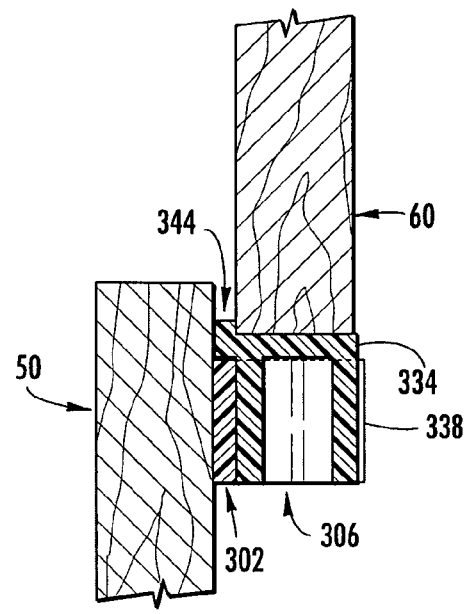
FIG. 8A is a sectional view taken along the line 8A—8A shown in FIG. 8 of the post piece of FIGS. 7–8 when it is used in conjunction with the clip piece of FIGS. 5–6 to connect a false front panel over an opening in an object.
Figure 8:
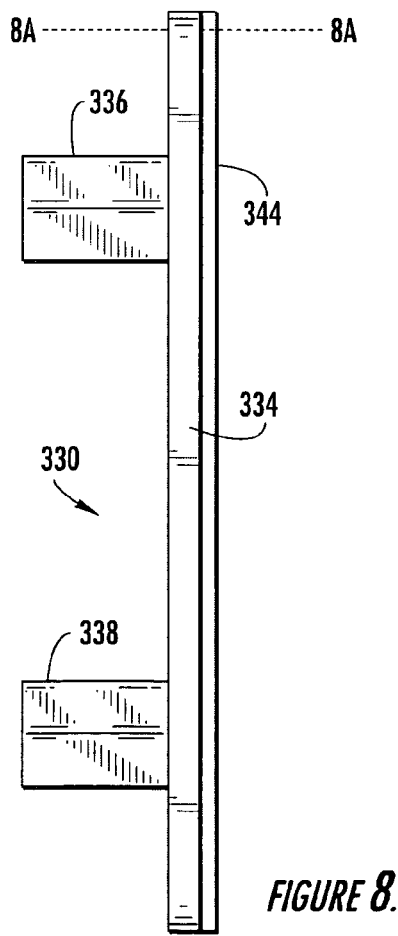
FIG. 8 is a side elevational view of the post piece of FIG. 7.

FIGS. 7 and 8 depict a post piece 330 that may be used in conjunction with the clip piece 302 depicted in FIGS. 5 and 6. As shown best in FIG. 8, the post piece 330 comprises a base panel 334 and two posts 336, 338. The base panel 334 has a rear face that may be configured to attach to or abut an object, and the posts 336, 338 extend outwardly from a front face of the base panel 334. The posts may be hollow (as shown in FIG. 7) or may be solid. The posts also may or may not have a continuous outer edge and they may comprise one (as shown in FIG. 7) or multiple projections that extend outwardly from the base panel 334.

As shown best in FIG. 7, the posts 336, 338 may have a non-circular cross section, such as the diamond-shaped cross section provided in the embodiment of FIGS. 5–10. As discussed herein, posts 336, 338 having a variety of other non-circular cross-sections may also be used, such as, for example, posts having hexagonal, oval, or pentagonal cross sections, or posts having kite-shaped and/or parallelogram shaped cross-sections. As shown in FIG. 7, the base panel 334 may include one or more apertures 339 that may be configured to receive a nail, screw, staple or other fastener that may be used to attach the post piece 330 to the object 60 that is to receive the false front panel 50.

The posts 336, 338 used in the embodiment of FIG. 7 have both a major axis 340 and a minor axis 342. The major axis 340 is longer than the minor axis 342. As shown in FIG. 7, in embodiments of the present invention the major axis 340 of the non-circular posts 336, 338 may be aligned so that the clip piece 302 mates with the post piece 330 by moving the clip piece in the direction of the major axis 340 until the snap clips 306, 308 fully engage the non-circular posts 336, 338. Such an orientation of the non-circular post may be advantageous because, by having the minor (shorter) axis 342 aligned normal to the direction in which the snap clips 306, 308 engage the posts 336, 338, it is possible to minimize the degree to which the arms 310, 320 of the snap clips 306, 308 must deflect when the snap clip mates with the post. By minimizing the amount of deflection it is possible to use snap clips that exhibit a lesser degree of resiliency at the resilient junctions provided between the base 304 and the first segments 312, 322 of the arms 310, 320 and between the first segments 312, 322 and the second segments 314, 324 of the arms 310, 320. Therefore, it is possible to use thicker arms, stiffer material and/or less ductile material in fabricating the clip piece 302. Accordingly, the false front connectors of the present invention may also advantageously provide for superior attachment as compared to the conventional false front connectors since the arms of the snap clip may exhibit less resiliency than false front connectors that use conventional posts having a circular cross section (where the minor axis and the major axis would be the same length).

A lip 344 may also be provided that projects outwardly from an edge of the rear face of the base panel 334. As discussed below, this lip 344 may be used to align the post piece 330 so that each post 336, 338 is located at the same depth within the opening 66. The lip 344 will also cause the false front panel 50 to have slight separation from the front face of the object to which it is attached. Such a separation may be desired, particularly in instances when the false front panel 50 is designed to appear like a drawer face, because it may make the false front panel 50 look more realistic. It will be appreciated by those of skill in the art that the lip 344 need not run the entire length of the edge of the post piece 330 and/or that the lip 344 may be broken into multiple smaller lips.

FIG. 8A illustrates how the lip 344 may be used to align the post piece and to also provide the separation between the false front panel 50 and the object 60. As shown in FIG. 8A, the post piece 330 may be inserted into the opening in the object 60 until the lip 344 abuts the front face of the object 60. Then a false front panel 50 containing a clip piece 302 may be inserted into the opening such that the snap clip 306 on the clip piece 302 mates with the post 336 on the post piece 330. As shown in FIG. 8A, the lip 344 operates to separate the false front panel 50 from the object 60 as discussed above.

FIG. 9 illustrates how a pair of the two-piece false front connectors 300 may be used to attach a false front panel 50 over an opening 66 in an object 60. The object 60 may be, for example, a bathroom cabinet having a false drawer front in front of the washbasin that covers an access hole to the inside of the cabinet. In FIG. 9, this access hole or opening 66 is defined walls 62, 63, 65, 67. The post piece 330 of the first false front connector 300 is attached to a side surface 62' of the wall 62. This may be done by inserting screws, nails or other fasteners through the apertures 339 provided in the base panel 334, or by other fastener means such as glue, staples or the like. The post piece 330 of the second false front connector 300 is similarly connected to a side surface 65' of the opposite wall 65. Each of the post pieces 330 is configured so that the posts 336, 338 project outwardly into the opening 66.

As is also shown in FIG. 9, the false front panel 50 has a front surface 52 and a rear surface 54. In the example of FIG. 9, the false front panel 50 is shaped like a drawer front and has a top edge 51, a bottom edge 53 and two side edges 55, 57. As shown in FIG. 9, the clip pieces 302 of two false front connectors 300 are attached adjacent each of the side edges 55, 57 of the rear surface 54. This may be done by inserting screws, nails or other fasteners through the apertures 309 provided in the base 304, or by other fastener means such as glue, staples, rivets or the like. Each clip piece 302 is positioned so that when it is mated with its respective post piece 330, the false front panel 50 will cover the opening 66 in the object 60. Thus, when the rear surface 54 of the false front panel 50 is placed over the opening 66, the snap clips 306, 308 on each clip piece 302 pass into the opening 66 so as to mate with the posts 336, 338 on the post pieces 330 with which they are matched.

As will be appreciated by those of skill in the art, as the false front panel 50 is moved closer to the opening 66, the third segments 316, 326 on the arms 310, 320 of the snap clips 306, 308 on each clip piece 302 come into contact with the posts 336, 338 with which each snap clip 306, 308 is aligned. As the false front panel 50 is moved farther into the opening 66, the third segments 316, 326 on each arm 310, 320 deflect outwardly away from each other as the respective posts 336, 338 are inserted into the interior of the snap clips 306, 308. Once the false front panel 50 has been moved sufficiently towards the opening 66 that the minor axis 342 of the posts 336, 338 has passed through the gap 327, the arms 310, 320 of the snap clips 306, 308 deflect back towards each, securely locking each post 336, 338 within the interior of the snap clips 306, 308. In this manner, the false front panel 50 may be securely fastened over the opening 66. The false front panel 50, however, may also be removed by applying sufficient force on the false front panel 50 in the direction away from the object 60 such that the arms 310, 320 of the snap clips 306, 308 deflect outwardly and the snap clips 306, 308 are pulled off the posts 336, 338.

It will be appreciated that the number or the position(s) of the two piece false front connectors 300 may be modified from what is shown in FIG. 9. For instance, the clip pieces 302 on the false front connectors 300 may be placed laterally adjacent the top edge 51 and the bottom edge 53 of the rear surface 54 of the false front panel 50 in lieu of or in addition to the clip pieces 302 shown adjacent the side edges 55, 57 of the rear surface 54. In such an embodiment, a corresponding post piece 330 would be provided on the side surfaces 63', 67' of walls 63, 67 of the object 60.

Figure 10A:
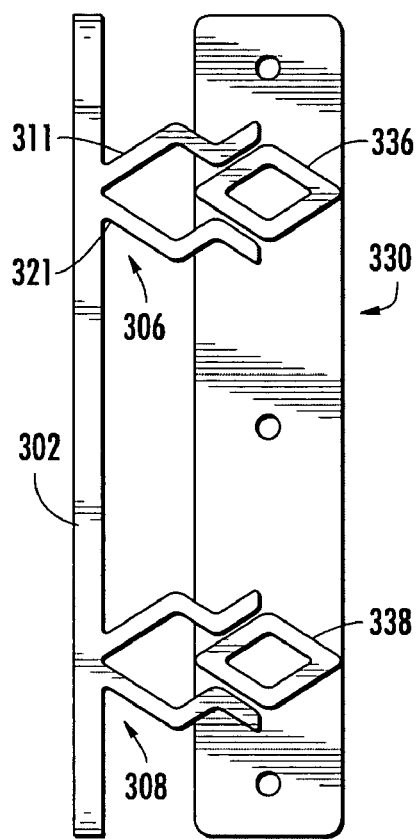
FIG. 10A is a front plan view of the post piece of FIG. 7 and a side elevational view of the clip piece of FIG. 5 that depicts how the snap clips deflect outwardly as the clip piece starts to mate with the post piece.
Figure 10B:
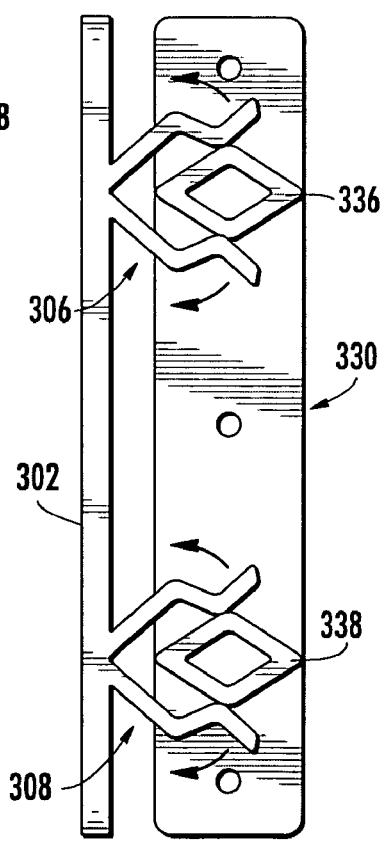
FIG. 10B is a front plan view of the post piece of FIG. 7 and a side elevational view of the clip piece of FIG. 5 that depicts how the snap clips deflect outwardly as the clip piece is moved closer to the post piece.
Figure 10C:
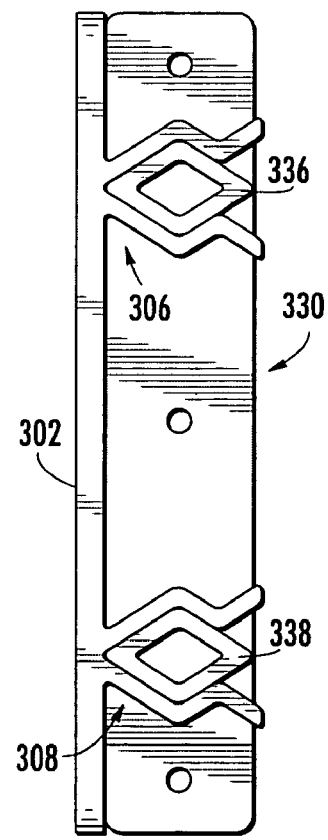
FIG. 10C is a front plan view of the post piece of FIG. 7 and a side elevational view of the clip piece of FIG. 5 that depicts how the snap clips snap back to their rest position as the clip piece fully mates with the post piece.

FIGS. 10A–C illustrate in greater detail how the snap clips 306, 308 mate with the posts 336, 338. As shown in FIG. 10A, the clip piece 302 is moved so that the third segments 316, 318 of the arms 310, 320 on each snap clip 306, 308 come into contact with the post 336, 338 associated with each respective snap clip. In the embodiment of FIG. 10A, the third segments 316, 318 of the arms 310, 320 on each snap clip 306, 308 are positioned so that the inner face of each third segment 316, 318 is parallel to the outer face of the post wall with which it comes into contact. As seen best in FIG. 10B, as the base 304 of the clip piece 302 is moved closer to the post piece 330, the arms 310, 320 of each snap clip 306, 308 bend outwardly about the resilient junctions provided where the respective arms attach to the base 304. As will be appreciated by those of skill in the art, the snap clips 306, 308 may be designed so that the junctions between the first segments 312, 322 and the second segments 314, 324 on each arm 310, 320 are also resilient (and hence deflect when the snap clips 306, 308 mate with the posts 336, 338). Eventually, the connections between the second segments 314, 324 and third segments 316, 326 on each of the arms 310, 320 of the snap clips 306, 308 pass beyond the minor axis 342 of the posts 336, 338. When this occurs, the arms 310, 320 on each snap clip 306, 308 cease their outward deflection and start to return to their rest position. This action causes the clip piece 302 to continue to mate further with the post piece 330 until each post 336, 338 is snugly locked within the interior of its corresponding snap clip 306, 308, as shown in FIG. 10C.

The false front connectors of the present invention may be easier to align than most conventional false front connectors for several reasons. Simplification of the alignment process can result in labor savings in the installation of false front panels, and may also facilitate providing false front panels that are properly installed so as to provide both a snug fit and so as to be readily releasable, if desired. One manner in which the false front connectors of the present invention may serve to simplify the alignment process is by providing a plurality (i.e., at least two) of snap clips per clip piece and/or a plurality of posts per post piece. This allows one alignment process to serve to align two or more snap clips with their respective posts in a single alignment step, thus typically reducing the overall number of alignments which need to be performed. Additionally, as noted above, the base panel 334 of the post piece 330 may include a lip 344 that may be used to make sure that each post 336, 338 is situated at a uniform depth within the opening 66.

Moreover, the post pieces of various prior art false front connectors may have a tendency to unscrew and become loose as the forces applied when the clip pieces are attached and removed from the post pieces may create rotational forces that may loosen the screws or other fasteners used to attach the post pieces to an object. The use of posts having non-circular cross-sections as taught by the present invention tends to reduce or eliminate this tendency for the post pieces to unscrew and/or loosen.

Additionally, alignment may further be facilitated by replacing the circular apertures 309 on the post piece 330 with elongated slotted apertures that allow adjustment of the clip piece or the post piece after the fastener has been inserted through the aperture. This use of slotted apertures allows the placement of the post piece 330 to be readily adjusted (by loosening but not removing the screw and moving the post piece along the axis of the slot) if the initial fit of the false front panel 50 over the opening 66 is sub-optimal. The slotted apertures may be provided to facilitate adjustment in either the up-down or side-to-side direction. The circular apertures 309 depicted on the clip piece 302 may likewise be replaced by elongated slotted apertures that allow the position of the clip piece 302 to be adjusted after it has been attached to the rear side 54 of the false front panel 50.

Figure 11A:
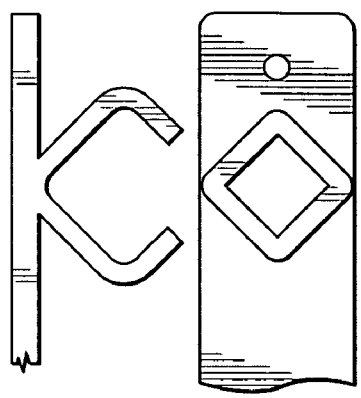
FIG. 11A is a front plan view of part of a post piece and a side elevational view of part of a clip piece that together comprise an alternative embodiment of the false front connectors of the present invention.
Figure 11B:
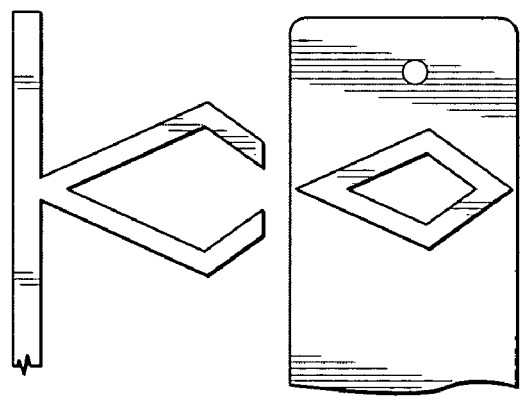
FIG. 11B is a front plan view of part of a post piece and a side elevational view of part of a clip piece that together comprise another embodiment of the false front connectors of the present invention.
Figure 11C:
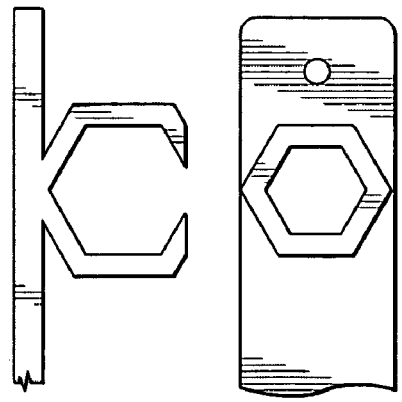
FIG. 11C is a front plan view of part of a post piece and a side elevational view of part of a clip piece that together comprise yet another embodiment of the false front connectors of the present invention.

It will be appreciated that the false front connectors disclosed herein may be modified in a variety of ways without departing from the scope and teachings of the present invention. For instance, the false front connectors may be configured to have more or fewer snap clips than the two snap clips 306, 308 illustrated in FIGS. 5–10. It will also be appreciated that the shape and thickness of the components that comprise each false front connector 300 may be varied from what is depicted in FIGS. 5–10. For instance, the third segments 316, 326 that are provided on the arms 310, 320 of each snap clip 306, 308 may be omitted in their entirety. Likewise the non-circular posts 336, 338 (and the corresponding cross-sectional shape of the snap clips 306, 308) may be designed to have a variety of configurations. FIGS. 11A–C depict examples of alternative post and snap clip designs according to the teachings of the present invention. Thus, it will be understood that the false front connectors depicted herein are exemplary, and that features thereof not recited in the claims appended hereto are not intended to limit the scope of those claims.

Figure 1A:
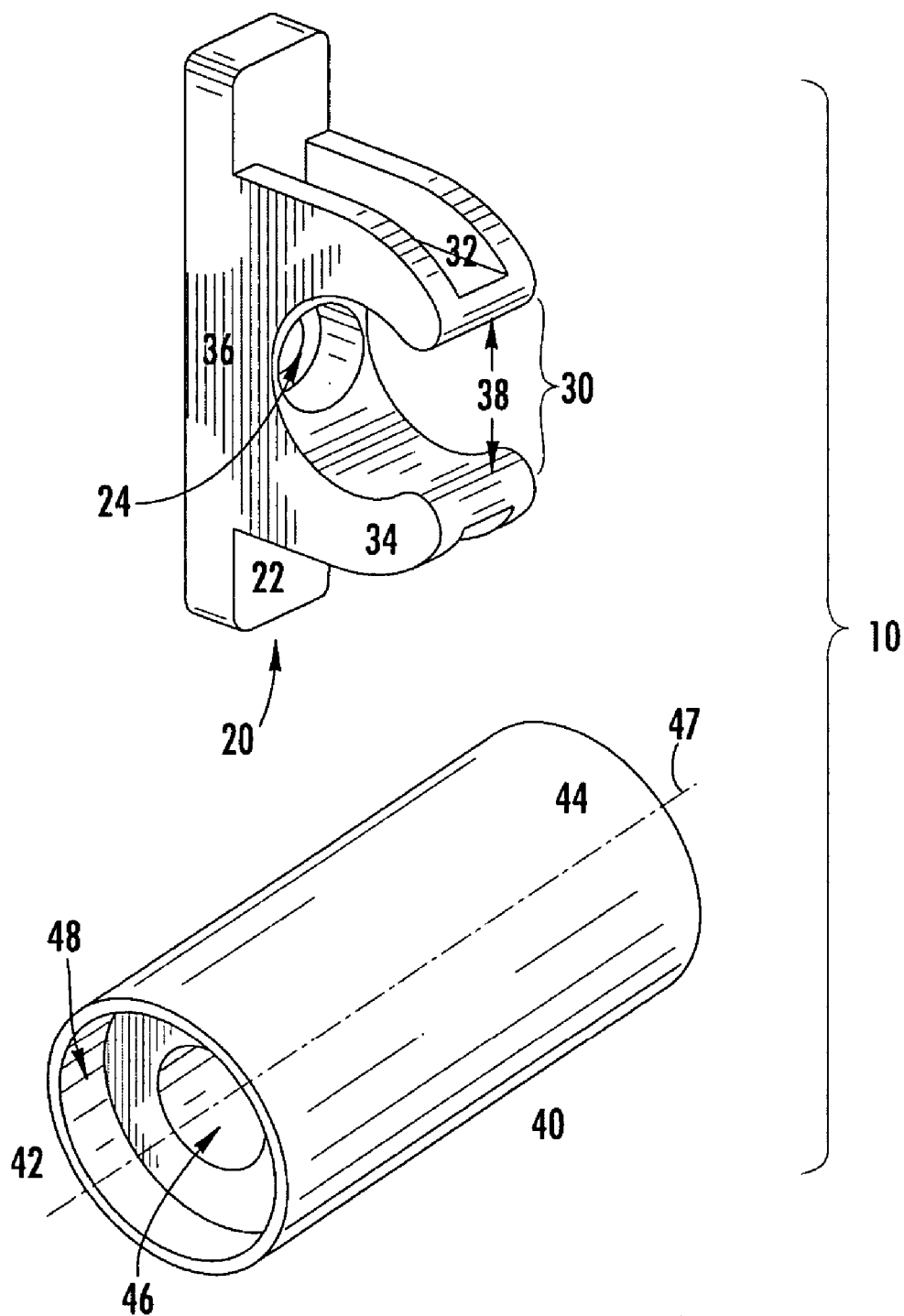
FIG. 1A is an exploded view of a prior art false front connector.
Figure 2A:
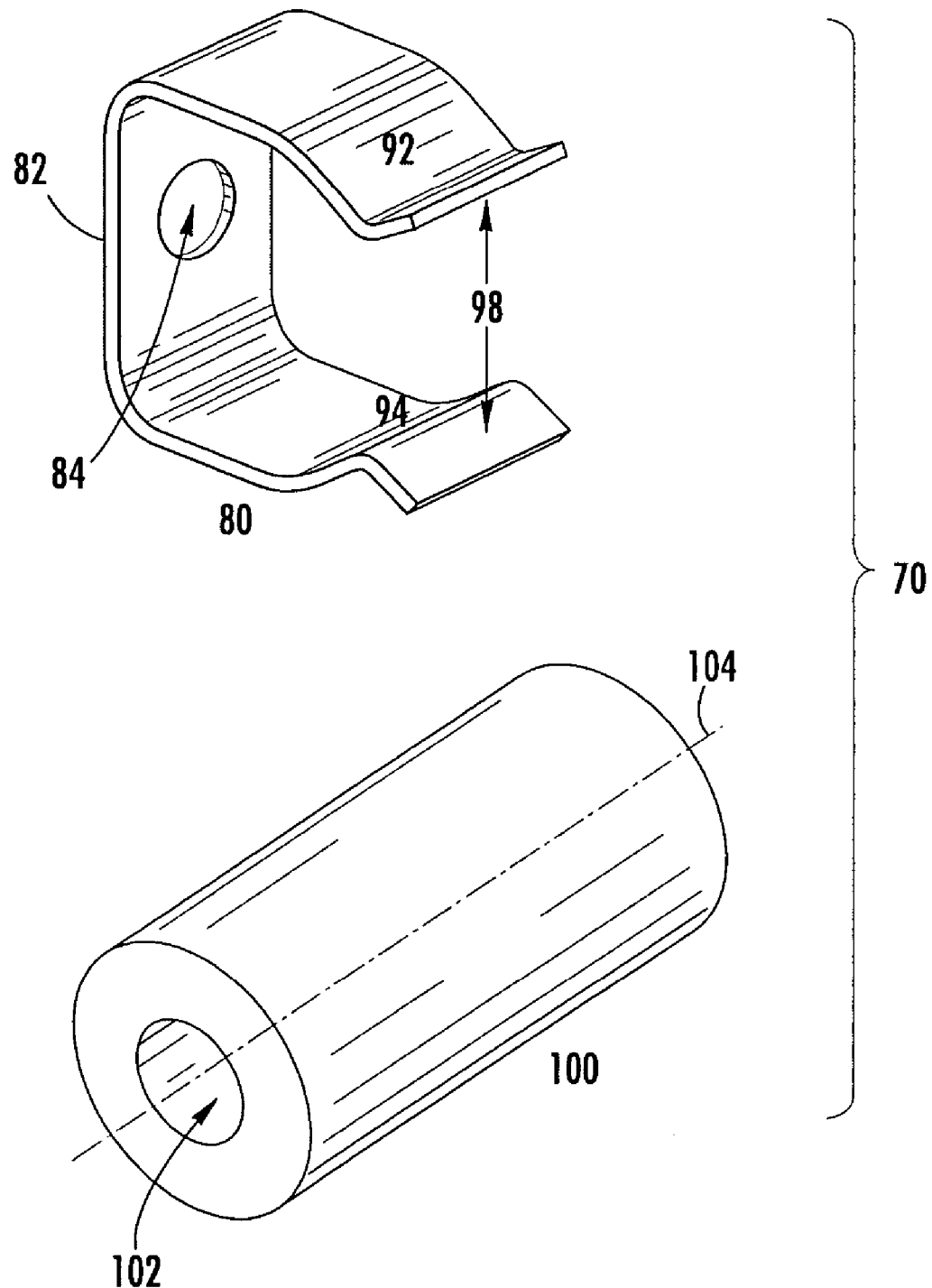
FIG. 2A is an exploded view of another prior art false front connector.
Figure 2B:
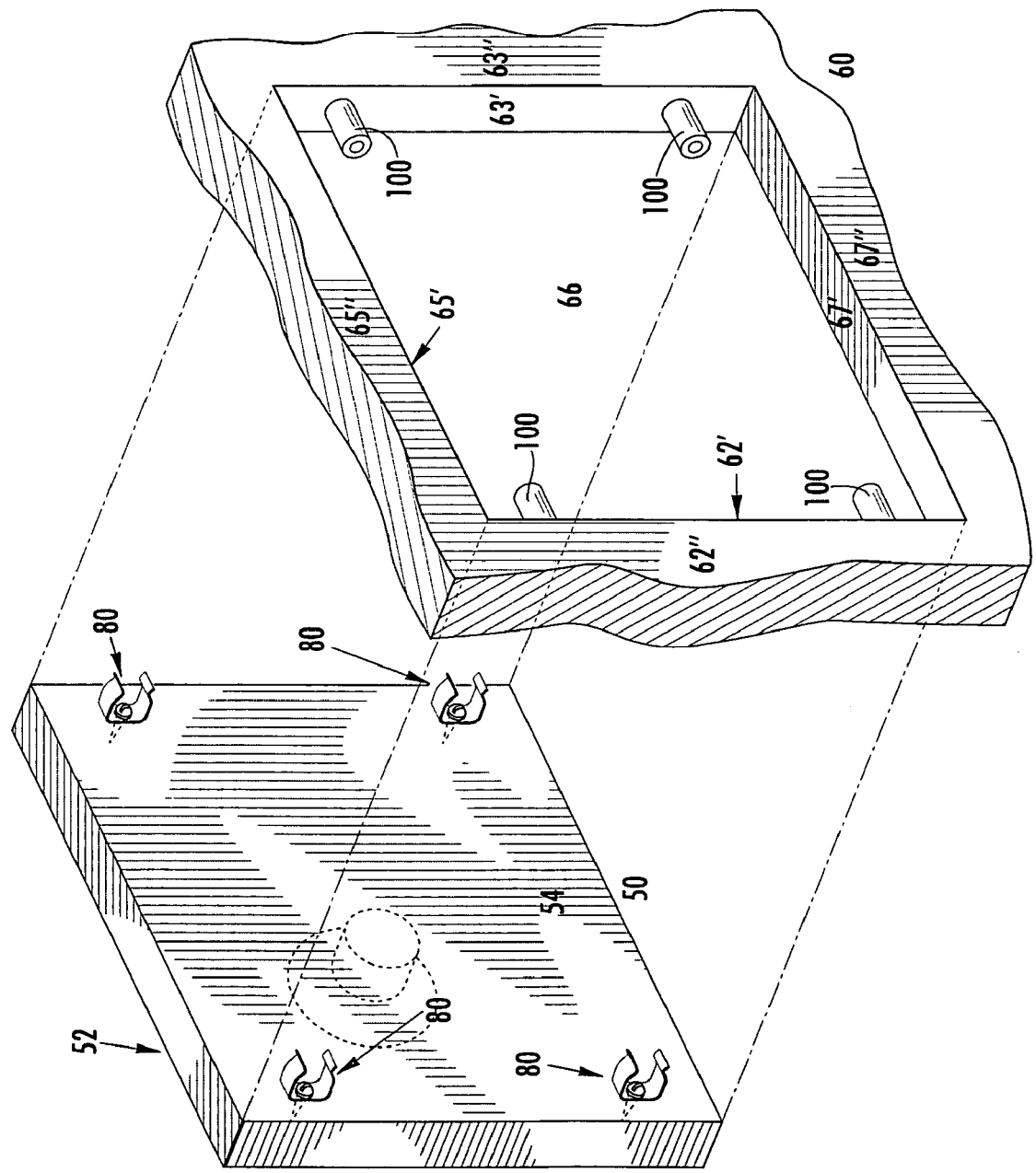
FIG. 2B is an exploded view of four of the false front connectors of FIG. 2A being used to connect a false front panel over an opening in an object.
Figure 3A:
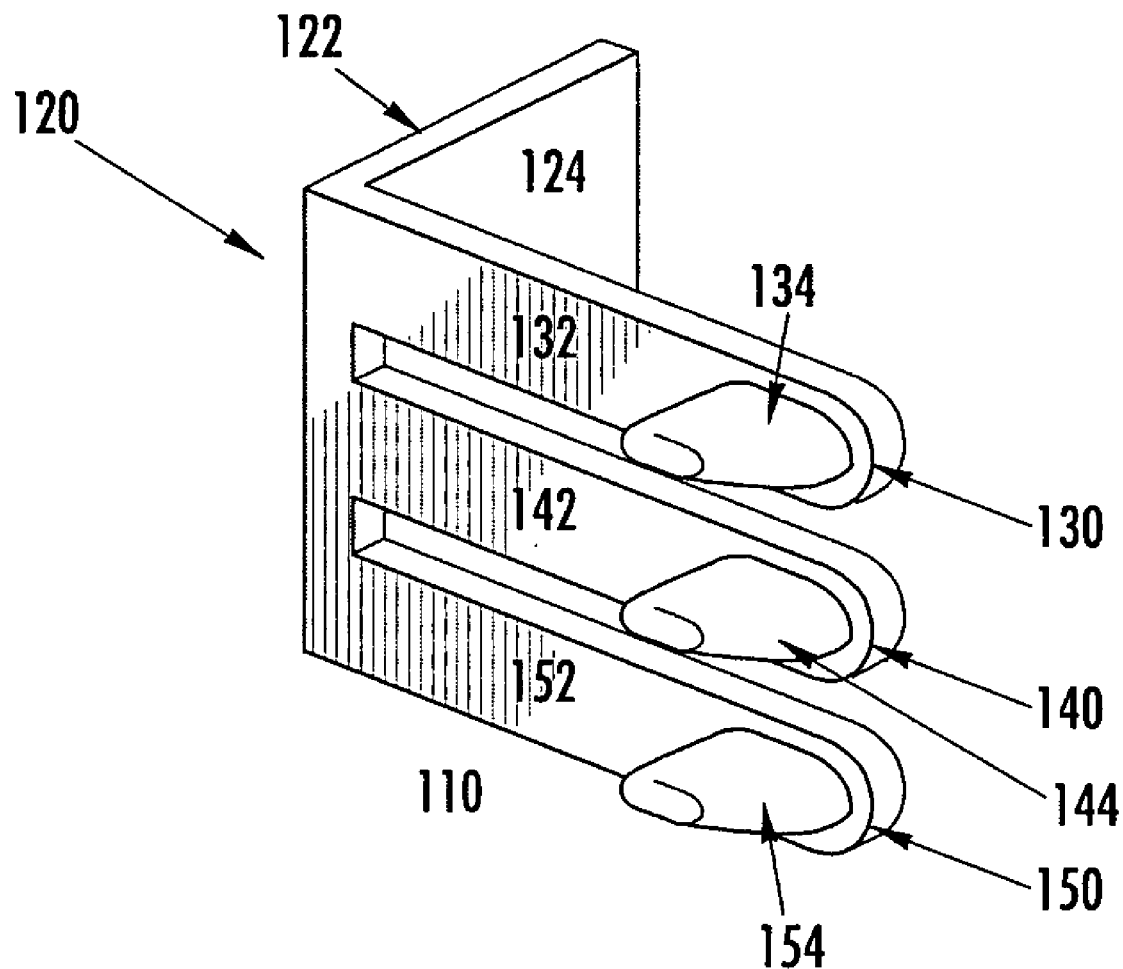
FIG. 3A is a perspective view of another prior art false front connector.
Figure 3B:
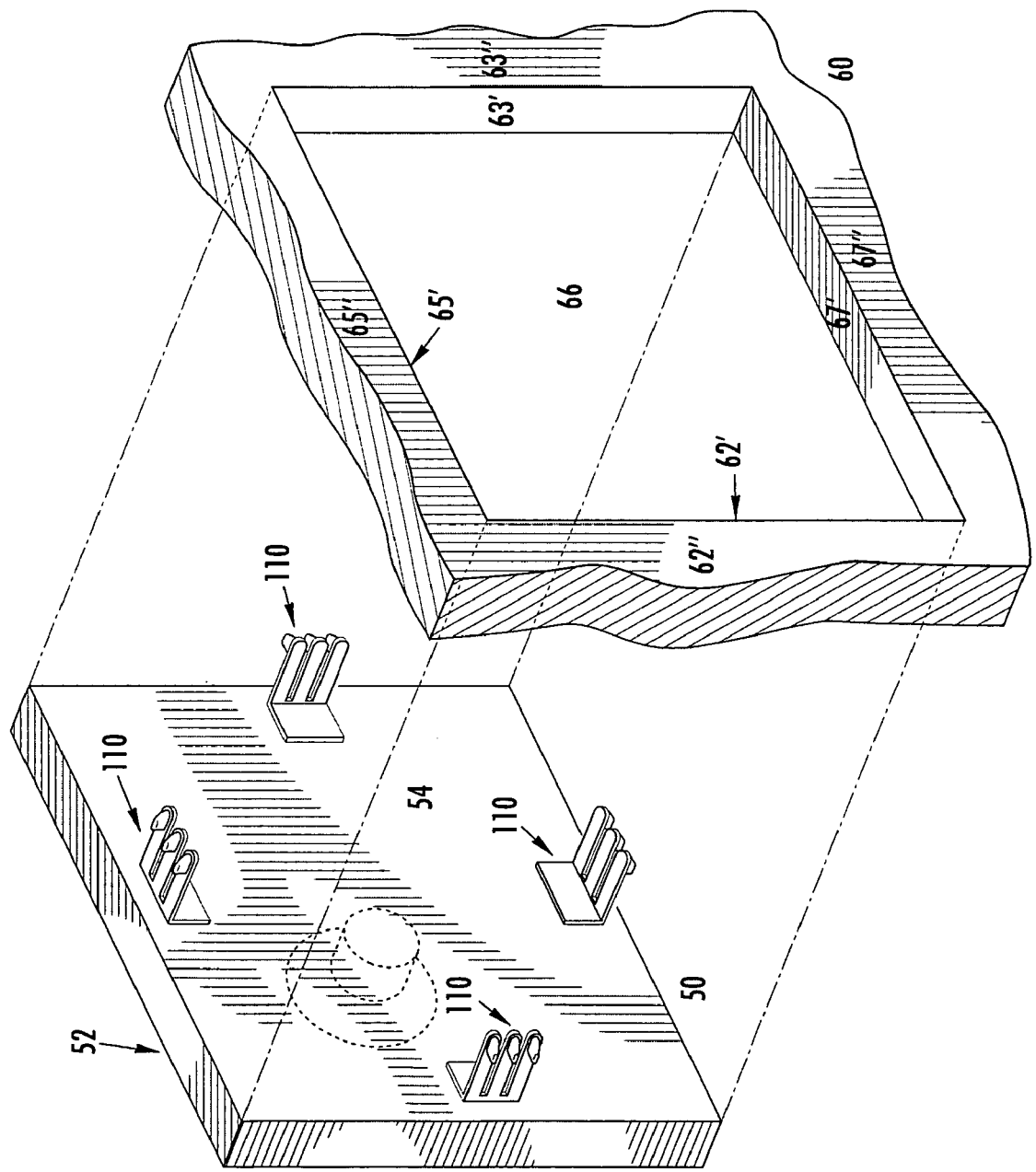
FIG. 3B is an exploded view of four of the false front connectors of FIG. 3A being used to connect a false front panel over an opening in an object.
Figure 4A:
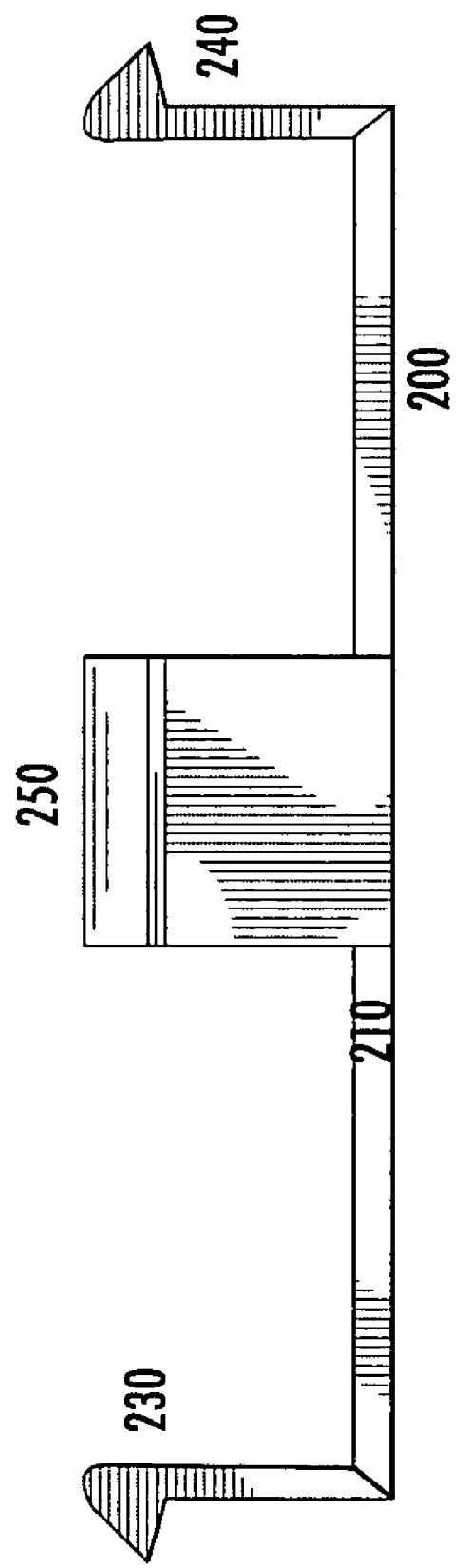
FIG. 4A is a side elevational view of another prior art false front connector.
Figure 4B:
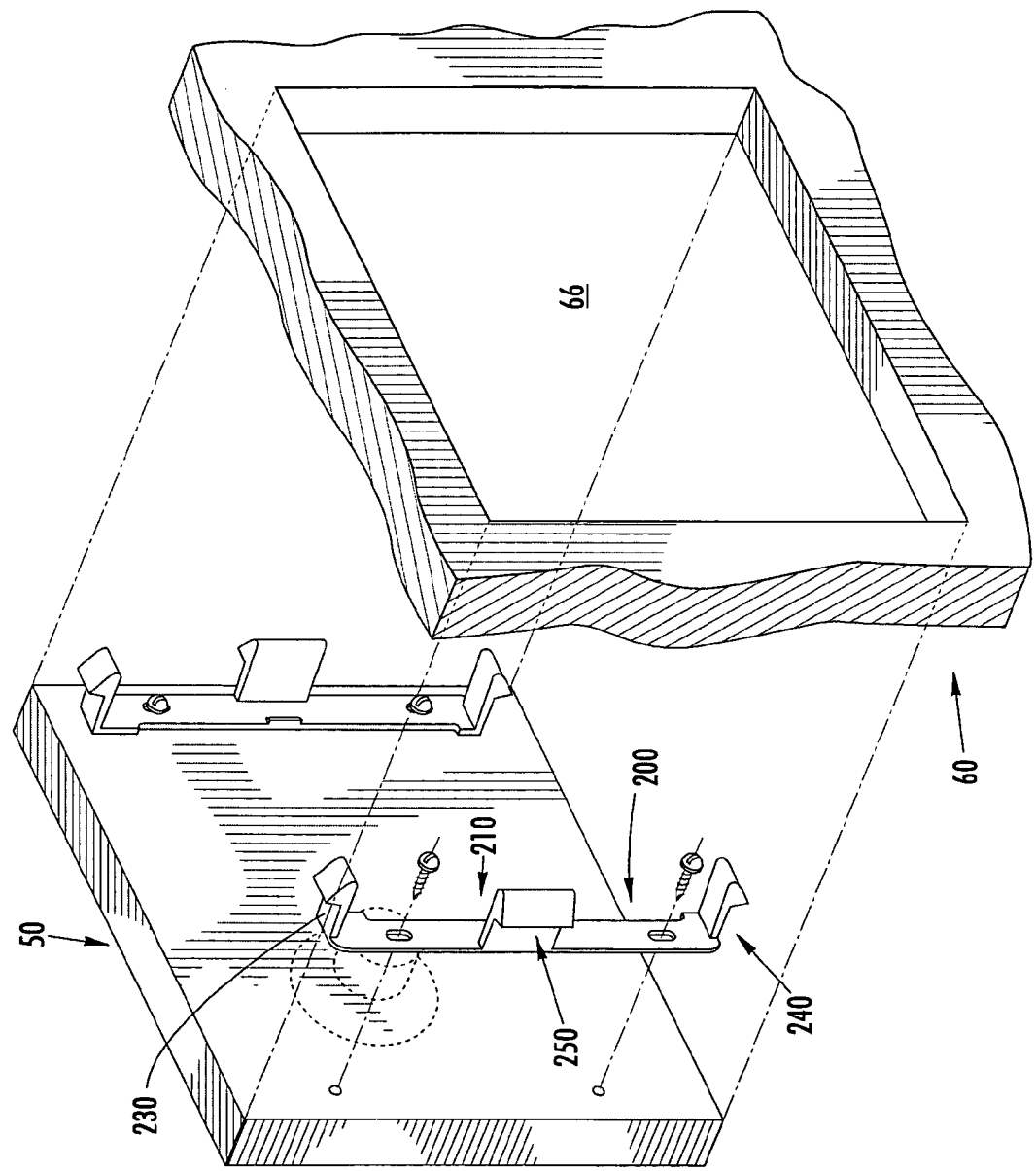
FIG. 4B is a perspective view of a pair of the false front connectors of FIG. 4A being used to connect a false front panel over an opening in an object.

The post having a "kite-shaped" cross-section (and matching snap clip configuration) illustrated in FIG. 11B may be particularly advantageous in certain applications. As shown in FIG. 1B, in this embodiment of the invention the snap clip traverses portions of the post having a relatively gentle slope when the clip piece is mated with the post, whereas the snap clip traverses portions of the post having a relatively steep slope when the clip piece is removed from the post piece. This configuration may make it easier to place the clip piece on the post than it is to remove the clip piece from the post piece.

In another embodiment of the present invention, the two-piece false front connectors 300 may include an appendage 305 that may minimize or prevent lateral movement of the false front panel 50. FIG. 12 illustrates how a pair of the two-piece false front connectors 300 that include the appendages 305 may be used to attach a false front panel 50 over the opening 66 in an object 60. As shown in FIG. 12, each appendage 305 may be implemented as a generally L-shaped appendage that extends from an exterior edge of the base 304 of the clip piece 302. The appendage 305 extends beyond the footprint of the base 304 of the clip piece 302 such that when the false front panel 50 is moved over the opening 66 each appendage 305 comes into contact with the base panel 334 of the corresponding post piece 330. The base panel 334 of each post piece 330 applies a force on each appendage 305 that deflects each appendage 305 toward the center of the opening 66. To the extent that the appendages 305 are formed from a resilient material this deflection creates a spring-like force whereby the appendages 305 push against the base panel 334 of each corresponding post piece 330, thereby helping to prevent lateral movement of the false front panel 50 when the panel 50 is installed over the opening 66.

While in FIG. 12 the appendages 305 are implemented as generally L-shaped arms, it will be appreciated by those of skill in the art that the appendages 305 need not be L-shaped. One or a plurality of appendages 305 may be provided, or the appendages 305 may be omitted altogether as in the embodiment of the present invention depicted in FIG. 9. The appendages 305 may also be located at different locations on the clip pieces 302. It will also be appreciated that similar appendages could be included at the top and bottom of the clip pieces 302 to minimize or prevent longitudinal movement of the false front panel.

In preferred embodiments of the present invention, the two-piece false front connectors of the present invention are manufactured out of a thermoplastic material such as polystyrene or ABS. However, those of skill in the art will appreciate that the false front connectors may be formed out of a wide variety of different materials, including any number of metals, synthetic compounds or the like. Typically, these false front connectors are injection molded from polymeric materials. As methods of manufacturing such connectors via conventional molding techniques are well known to those of skill in the art, the methods for manufacturing these connectors will not be discussed further herein.

As noted above, a variety of fasteners or other attachment means may be used to fasten the connectors disclosed herein to the false front panel 50, including, for example, screws, nails, staples, tacks or rivets. Herein, the clip pieces of the present invention are described as abutting, attaching and/or connecting to the rear surface of a false front panel and the post pieces are described as abutting, attaching and/or connecting to the walls of the opening. It will be appreciated that such language is intended to cover situations where the clip piece and/or post piece are directly attached to the false front panel/walls, as well as situations where they are connected via intervening structures.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A false front connector for connecting a false front panel over an opening in an object, comprising:
   a clip piece that comprises:
      a base configured to attach to a rear face of the false front panel;
      a snap clip that comprises a pair of opposed arms that project from the base;
      wherein each arm of the snap clip includes a first segment that is adjacent to the base and a second segment that projects outwardly from a distal portion of the first segment;
      wherein the base and an inner face of the first segment of each arm define an obtuse angle; and
   a post piece configured to attach to the object, wherein the post piece includes a post that is configured to be received within an opening provided between the pair of opposed arms of the snap clip and a base panel having a rear face configured to attach to the object, and wherein the post extends outwardly from a front face of the base panel;
      wherein the clip piece further comprises a second snap clip and wherein the post piece further includes a second post that extends outwardly from the front face of the base panel, wherein the second post is configured to be received within an opening provided between the pair of opposed arms of the second snap clip.

2. The false front connector of claim 1, wherein the first segment of each arm of the snap clip is a planar segment.

3. The false front connector of claim 1, wherein the arms of the snap clip are mirror images of each other about a plane that bisects the snap clip.

4. The false front connector of claim 1, wherein the first segment of each arm of the snap clip is thickened adjacent a connection between each arm and the base.

5. A false front connector for connecting a false front panel over an opening in an object, comprising:
   a clip piece that comprises:
      a base configured to attach to a rear face of the false front panel;
      a snap clip that comprises a pair of opposed arms that project from the base;
      wherein each arm of the snap clip includes a first segment that is adjacent to the base and a second segment that projects outwardly from a distal portion of the first segment;
      wherein the base and an inner face of the first segment of each arm define an obtuse angle; and
   a post piece configured to attach to the object, wherein the post piece includes a post that is configured to be received within an opening provided between the pair of opposed arms of the snap clip;
      wherein the pair of opposes arms of the snap clip each further include a third segment that projects from a distal end of the snap clip.

6. The false front connector of claim 5, wherein the first segment and the third segment of each arm of the snap clip are substantially parallel to each other.

7. The false front connector of claim 5, wherein the first and second segments of each arm meet to define an angle that is at least 90 degrees.

8. The false front connector of claim 7, wherein the angle is between 110 degrees and 160 degrees.

9. The false front connector of claim 5, wherein the post has a non-circular cross-section.

10. The false front connector of claim 5, wherein the first and second segments of each arm of the snap clip meet to form a resilient junction.

11. The false front connector of claim 5, wherein the third segment of each arm of the snap clip is substantially parallel to the second segment of the other arm of the snap clip.

12. The false front connector of claim 5, wherein the first segment of each arm of the snap clip is thickened adjacent a connection between each arm and the base.

13. A false front connector for connecting a false front panel over an opening in an object, comprising:
a post piece configured to attach to the object that includes a post having a non-circular cross-section;
a clip piece that comprises a base that is configured to attach to a rear face of the false front panel and a snap clip projecting from the base that is configured to receive the post having the non-circular cross-section.

14. The false front connector of claim 13, wherein the non-circular cross-section of the post defines a polygon.

15. The false front connector of claim 14, wherein the polygon has a major axis and a minor axis that is shorter than the major axis.

16. The false front connector of claim 13, wherein the post piece further comprises a base panel having a rear face configured to attach to the object, and wherein the post extends outwardly from the front face of the base panel.

17. The false front connector of claim 16, wherein an exterior edge of the base panel further includes a raised lip.

18. The false front connector of claim 13, wherein the post piece is a unitary piece made of a polymeric material.

19. The false front connector of claim 13, wherein the clip piece is a unitary piece made of a polymeric material.

20. The false front connector of claim 13, wherein the post has a diamond-shaped cross-section.

21. The false front connector of claim 13, wherein the base of the clip piece further comprises first and second slots configured to receive first and second fasteners which connect the clip piece to the rear face of the false front panel and enable the clip piece to be adjusted relative to the false front panel.

22. The false front connector of claim 13, wherein the post has a kite-shaped cross-section.

23. The false front connector of claim 13, wherein the post piece further comprises first and second slots configured to receive first and second fasteners which connect the post piece to the object and enable the post piece to be adjusted relative to the object.

24. A cabinet, comprising:
a frame having a front face, wherein said front face includes an opening defined by a plurality of walls;
a false front panel having a front side and a rear side configured to attach to the front face of the frame over the opening therein; and
at least one false front connector that comprises:
a post piece configured to attach to the frame, the post piece comprising a base panel and a post having a non-circular cross-section extending from the base panel, wherein an exterior edge of the base panel includes a raised lip;
a clip piece that comprises a base that is configured to attach to the rear side of the false front panel and a snap clip projecting from the base that is configured to receive the post having the non-circular cross-section.

25. The cabinet of claim 24, wherein the non-circular cross-section of the post defines a polygon.

26. The cabinet of claim 25, wherein the polygon has a major axis and a minor axis that is shorter than the major axis.

27. The cabinet of claim 24, wherein the clip piece further comprises a second snap clip projecting from the base and configured to receive a second post having the non-circular cross-section.

28. The cabinet of claim 24, wherein the post has a diamond-shaped cross-section.

29. A false front connector for connecting a false front panel over an opening in an object, comprising:
a clip piece that comprises:
a base configured to attach to a rear face of the false front panel;
wherein each arm of the snap clip includes a first segment that is adjacent to the base and a second segment that projeccts outwardly from a distal portion of the first segment;
wherein the base and an inner face of the first segment of efach arm define an obtuse angle; and
a post piece configured to attach to the object, wherein the post piece includes a post that is configured to be received within an opening provided between the pair of opposed arms of the snap clip, wherein the post piece further comprises a base panel having a rear face configured to attach to the object, wherein an exterior edge of the base panel further includes a raised lip, and wherein the post extends outwardly from a front face of the base panel.

30. A false front connector for connecting a false front panel over an opening in an object, comprising:
a clip piece th;at comprises:
a base configured to attach to a rear face of th;e false front panel;
a snap clip that comprises a pair of opposed arms that project from the base;
wherein each arm of the snap clip includes a first segment that is adjacent to the base and a second segment that projects outwardly from a distal portion of the first segment;
wherein the base and an inner face of the first segment of each arm define an obtuse angle; and
a post piece configured to attach to the object, wherein the post piece includes a post that is configured to be received within an opening provided between the pair of opposed arms of the snap clip;
wherein the clip piece further comprises an appendage that projects outwardly from the base that is configured to engage a portion of the post piece.

31. The false front connector of claim 30, wherein the appendage is formed of a resilient material.

32. A cabinet, comprising:
a frame having a front face, wherein said front face includes an opening defined by a plurality of walls;
a false front panel having a front side and a rear side attached to the front face of the frame over the opening therein; and at least one false front connector that comprises:
- a post piece attached to the frame that includes a post having a non-circular cross-section that extends along an axis into the opening; and
- a clip piece that comprises a base that is attached to the rear side of the false front panel and a snap clip projecting from the base that is configured to receive the post having the non-circular cross-section;
- wherein the clip piece is attached to the post piece via movement in a direction perpendicular to the axis of the post.

33. The cabinet of claim 32, wherein the post piece is a unitary piece made of a polymeric material.

34. The cabinet of claim 32, wherein the clip piece is a unitary piece made of a polymeric material.

35. The cabinet of claim 32, wherein the post is diamond shaped.

36. The cabinet of claim 32, wherein the clip piece includes at least one aperture configured to receive a fastener.

37. The cabinet of claim 32, wherein the post piece includes at least one aperture configured to receive a fastener.

38. A cabinet, comprising:
- a frame having a front face, wherein said front face includes an opening defined by a plurality of walls;
- a false front panel having a front side and a rear side attached to the front face of the frame over the opening therein; and
- a first false front connector that comprises:
  - a first post piece mounted on a first of the plurality of walls that includes a first post having a non-circular cross-section that extends along an axis into the opening; and
  - a first clip piece that comprises a first base that is attached to the rear side of the false front panel and a first snap clip projecting from the first base that is configured to receive the first post;
- a second false front connector that comprises:
  - a second post piece mounted on a second of the plurality of walls that includes a second post having a non-circular cross-section that extends along an axis into the opening; and
  - a second clip piece that comprises a second base that is attached to the rear side of the false front panel and a second snap clip projecting from the second base that is configured to receive the second post;
- wherein the first post extends towards the second of the plurality of walls and the second post extends towards the first of the plurality of walls.

39. The cabinet of claim 38, wherein the first clip piece further comprises a third snap clip projecting from the first base, and wherein the second clip piece fUrther comprises a fourth snap clip projecting from the second base.

40. The cabinet of claim 38, wherein the first and second post pieces each include a base panel that has a raised lip.

* * * * *

UNITED STATES PATENT AND TRADEMARK OFFICE
CERTIFICATE OF CORRECTION

| | | |
|---|---|---|
| PATENT NO. | : 7,178,886 B2 | Page 1 of 1 |
| APPLICATION NO. | : 10/667181 | |
| DATED | : February 20, 2007 | |
| INVENTOR(S) | : Hightower | |

It is certified that error appears in the above-identified patent and that said Letters Patent is hereby corrected as shown below:

On Title Page Item (56) should be items 5, 6

<u>Other Publications</u>
Pictures of two piece prior art connector (admitted prior art)

<u>Column 13,</u>
Line 27: Please add after cross-section --(and a second snap clip projecting from the base and configured to receive a second post having the non-circular cross-section.)--

<u>Column 14,</u>
Line 24: Please add this paragraph after "panel;"
--a snap clip that comprises a pair of opposed arms that project from the base;--

Line 30: Correct "efach" to read --each--

<u>Column 16,</u>
Line 24: Correct "fUrther" to read --further--

<u>Claim 27</u> was not added.
27. The false front connector of Claim 26, wherein the clip piece is a unitary piece made of a polymeric material.

Signed and Sealed this

Twenty-fourth Day of April, 2007

JON W. DUDAS
*Director of the United States Patent and Trademark Office*